UNITED STATES PATENT OFFICE.

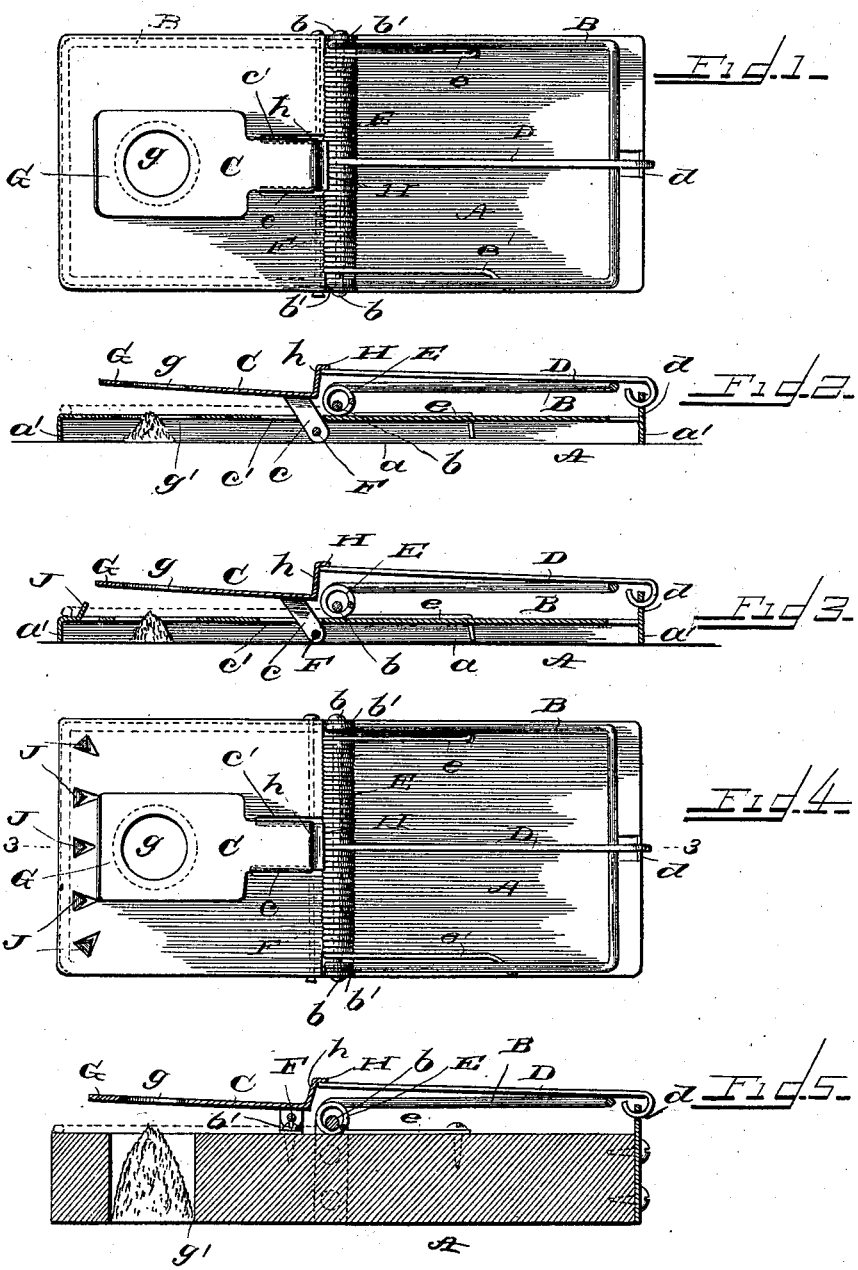

CHARLES F. NELSON, OF GALESBURG, ILLINOIS.

ANIMAL-TRAP.

SPECIFICATION forming part of Letters Patent No. 661,068, dated November 6, 1900.

Application filed November 18, 1899. Serial No. 737,534. (No model.)

*To all whom it may concern:*

Be it known that I, CHARLES F. NELSON, a citizen of the United States, residing at Galesburg, in the county of Knox and State of Illinois, have invented certain new and useful Improvements in Animal-Traps, of which the following is a specification.

My present invention relates to certain new and useful improvements in animal-traps; and its primary object is to provide a trap which may be baited in such a manner that the bait cannot be removed by an animal without springing the trap.

It has been customary heretofore to set traps for catching mice, rats, and similar animals by locating the bait in a comparatively-unprotected position upon the trigger or base of the trap and so that when the animal nibbles or pulls at the bait a spring-jaw will be freed and fly back to engage and hold the animal between itself and the base. It has been found that in some instances the bait will be removed and eaten by the animal without springing the trap, and it is to provide a trap of simple construction in which the bait cannot be removed without releasing the engaging jaw that my present invention is particularly directed.

The invention also has in view to provide a trap of simple construction which can be manufactured inexpensively in a very few parts and assembled to provide a trap adapted to be easily and quickly set and one which is effective in practical use.

With these and other ends in view the invention consists of the peculiar construction and arrangement of parts hereinafter described, and illustrated in the accompanying drawings, in which—

Figure 1 is a top plan view of a trap embodying my invention. Fig. 2 is a longitudinal sectional view of the trap. Fig. 3 is a sectional view on the line 3 3 of Fig. 4. Fig. 4 is a top plan view of a trap provided with impaling-prongs. Fig. 5 is a longitudinal sectional view of a trap provided with a wooden base.

Referring to the drawings, in which like letters of reference denote corresponding parts in all of the figures, A designates the base, B the engaging jaw, C the trigger, and D the locking device, of my improved trap. The base is preferably formed out of a piece of sheet metal and provided with the depending sides $a$ and ends $a'$, on which the trap stands. While I prefer to form the base out of sheet metal, as shown in the first four figures of the drawings, I may provide a wooden base, as shown in Fig. 5, if desired.

The engaging jaw B is pivotally supported on the shaft $b$, which is journaled in the lugs $b'$, stamped up out of the base, at or about midway between the ends of the base. A spiral spring E is arranged on this shaft, and one of its ends $e$ is extended and has a bearing upon the base, while the other end $e'$ is extended and bears upon the engaging jaw, whereby the tension of the spring is imparted to the jaw and the latter caused to fly back when the trap is sprung to engage the animal with sufficient force to prevent its escape. Instead of the single spring illustrated and described herein I may employ two springs, if desired.

The trigger C is provided with parallel depending arms $c$, which pass through the slots $c'$ in the base and are pivotally mounted on the trigger-shaft F. This trigger is provided with a bait-plate G, and the bait-plate has an opening $g$ therein which registers with a corresponding opening $g'$ in the base for a purpose hereinafter described.

The locking device D consists of an arm loosely pivoted in a lug $d$, struck up from the base, at the rear end thereof, and this arm is of such a length that it will extend forward and under the lug H on the upward extension $h$ of the trigger.

The trap may be provided with a number of upwardly and inwardly extending prongs J, as shown in Figs. 3 and 4, which prongs can be struck up from the base to prevent the animal escaping from the trap after the engaging jaw has been sprung.

To set the trap, the engaging jaw is carried forward into the position shown in Fig. 1, and then the locking-arm is swung over the engaging jaw and its end engaged under the lug H of the trigger. The spring tension of the engaging jaw exerted upwardly against the locking-arm is sufficient to keep the arm in its locked engagement with the trigger and the bait-plate of the trigger in the lifted position shown in Fig. 2, so that when the animal endeavors to get at the bait and presses upon the trigger the lug H and locking-arm will be disengaged, permitting the engaging jaw to fly back and strike and hold the animal against the base.

As hereinbefore stated, one of the primary objects of this invention is to provide for locating the bait so that it cannot be removed without springing the trap, and this is accomplished by having the registering holes $g$ $g'$ in the bait-plate and base, so that the bait may be placed on the floor under the holes. When the bait is in this position, it will be necessary for the animal to poke, force, or shove its head through the opening in the bait-plate in order to get at the bait, and in so doing it will inevitably release the trigger and spring the trap. When a solid wooden base is provided for the trap, as shown in Fig. 5, said base may have a recess for the bait or an opening extending through the same and registering with the opening $g$ in the bait-plate, as hereinbefore described.

Changes and modifications may be made in the details of construction and the arrangement of parts without departing from or sacrificing the advantages of my invention, and I reserve the right to make such changes as fall within the spirit and scope of the invention.

In the drawings I have illustrated a trap of comparatively small size which can be used for catching small animals, such as mice. For larger animals a larger trap will of course be provided to secure the proper degree of strength in the several parts. The larger traps will generally be provided with the impaling-prongs, but they are not essential for the smaller traps.

It will be observed that in the trap constructed as I have shown and described the animal cannot reach the bait from beneath the bait-plate; but in order to get it it must poke, force, or shove its head down into the opening in the bait-plate, and thereby press sufficiently thereon to spring the trap.

Having thus fully described my invention, what I claim, and desire to secure by Letters Patent, is—

1. In an animal-trap, the combination with a spring-controlled engaging jaw and a locking device, of a base and a trigger each provided with a registering bait-opening, substantially as and for the purpose described.

2. In an animal-trap, the combination with a spring-controlled engaging jaw and a locking device, of a trigger, and a base formed of a single sheet of metal, said trigger and base being provided with registering bait-openings, substantially as described.

3. In an animal-trap, the combination with a spring-controlled engaging jaw and a locking device, of a trigger provided with a baiting-plate having a bait-opening therein and a base formed of a single sheet of metal and provided with depending sides and ends, said base having a bait-opening registering with the opening in the bait-plate, substantially as described.

4. In an animal-trap, the combination with a base, of a spring-controlled engaging jaw pivotally mounted on the base, a locking device, a trigger provided with depending arms extending through slots in the base and an engaging lug, and means for pivoting the trigger to the base, substantially as described.

5. In an animal-trap, the combination with a base formed of a single sheet of metal and provided with depending sides and ends and a bait-opening, of a spring-controlled engaging jaw pivotally mounted on the base, a lug struck up from the base at the rear end thereof, a locking-arm loosely pivoted to said lug, and a trigger comprising a bait-plate provided with a bait-opening registering with the opening in the base, a lug to be engaged with the locking device and integral depending arms extending downwardly through slots in the base, and means for pivoting said arms to the base, substantially as described.

CHARLES F. NELSON.

Witnesses:
AHAB P. GREEN,
JAMES O. CONNOR.